Patented May 5, 1953

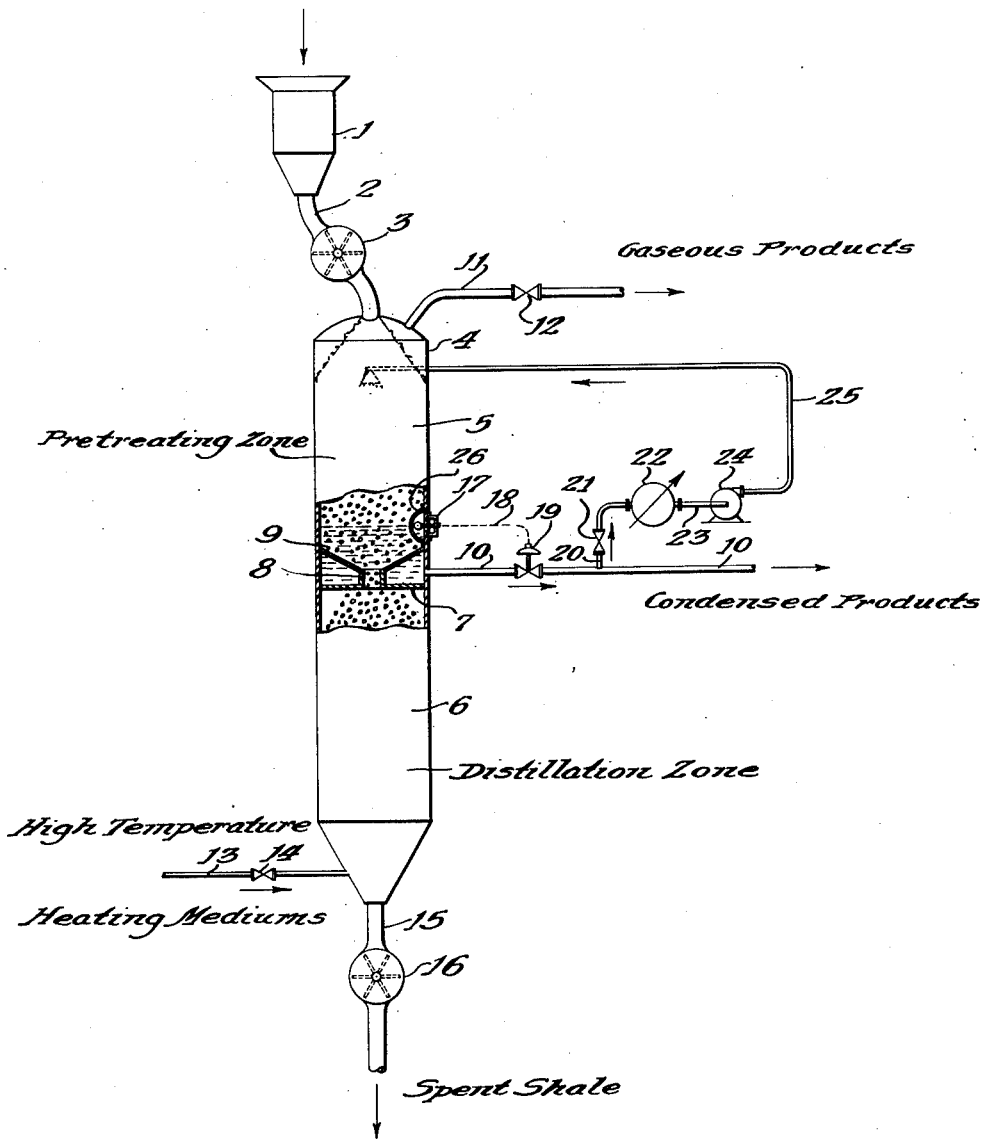

2,637,683

UNITED STATES PATENT OFFICE 2,637,683

DISTILLATION OF SOLID CARBONACEOUS MATERIALS

Louis S. Kassel, Riverside, Ill., assignor to Universal Oil Products Company, Chicago, Ill., a corporation of Delaware Application December 24, 1948, Serial No. 67,205

7 Claims. (Cl. 202—11)

This invention relates to an improved continuous process for extracting valuable products from shale, or other hydrocarbonaceous solid materials. The improved extraction operation incorporates both the steps of preheating and effecting a solvent action on a bed of crushed solid material, together with the high temperature distillation of the thusly pretreated material in a separate distillation zone with a hot gaseous medium.

It is a principal object of the present invention to provide a combined solvent extraction and high temperature distillation operation in order to obtain benefits from each in the removal of desired organic constituents not easily removed by the use of either process alone.

It is also an object of the present invention to recover and utilize the heat supplied by a gaseous heating medium for high temperature distillation purposes, to advantageously effect a preheating and pretreating of the solid hydrocarbonaceous material.

It is still another object of the invention to provide a modified operation and flow arrangement which maintains a continuously descending bed of shale through an elevated preheating and condensing zone, and solid material bed descending by gravity through a lower distillation zone, with resulting hot gaseous and condensable products passing upwardly from the lower zone into the pretreating zone, to be recovered therefrom.

Briefly, the improved recovery operation comprises, passing crushed hydrocarbon solids downwardly through a combined preheating and condensation zone countercurrently to an upwardly rising stream of distillation products and gaseous heating medium being introduced at the lower end thereof, effecting simultaneously a preheating of the solid material and a condensation of the heavier distillation products on the relatively cool hydrocarbonaceous material being introduced into the upper zone, collecting and withdrawing resulting condensation products from the lower end of the zone and discharging uncondensed light distillation products from the upper end thereof, passing the preheated solid material from the lower end of the preheating and condensation zone downwardly to a high temperature distillation zone maintained below and in communication with the upper zone, introducing a high temperature gaseous medium upwardly through the lower distillation zone and effecting the distillation and removal of hydrocarbonaceous products from the solids therein, discharging residual spent solids from the lower end of the distillation zone, and passing the resulting distillation products and heating medium upwardly through the upper zone countercurrently to the descending bed as hereinbefore stated.

In a preferred embodiment of this improved removal operation, a substantially deep pool of the condensed products from the distillation zone is maintained within the lower portion of the upper preheating and condensation zone, such that the crushed solid material passes through the condensate and the hot oil will exert a solvent action on the solid material prior to its being discharged into the lower high temperature distillation zone. Thus, means are necessarily provided at the lower end of the pretreating zone for maintaining a pool of condensate and for continuously withdrawing a portion of the condensed liquid phase, while permitting the descending bed of solids material to continuously pass into the lower distillation zone.

It is a particular feature of this improved operation to maintain a pool of hot oil in the upper pretreating zone sufficiently deep to insure that all of the solid material is subjected to the solvent action of the condensed oil phase. While the hot oil pool will extract only a portion of the organic matter of the solid hydrocarbonaceous material a definite advantage is gained with the combined operation, for instance in contacting shales, certain asphaltic constituents may be partially extracted by the solvent action of the hot oil, and caking may be diminished within the bed of material passing through the high temperature distillation zone countercurrently to a hot gaseous stream.

It is also a feature of the improved operation of this invention to provide means for passing a portion of the condensed product stream to the upper end of the preheating zone to insure the condensation of a sufficient portion of the distillation products passing upwardly through that zone, and to maintain a sufficiently deep pool of condensed liquid within the lower portion of the upper zone.

The improved operation and the features of the present invention may be best described and explained in conjunction with the accompanying diagrammatic drawing which shows an elevational view of an apparatus suitable for effecting the embodiments of the present invention.

Referring now to the drawing, crushed shale is passed downwardly from a hopper 1 through a line or conduit 2 and a suitable sealing and flow regulating device such as for example the star feeder indicated at 3, into a retort chamber 4, having an upper pretreating zone 5 and a lower distillation zone 6. While the following description of the improved operation will refer to the solid hydrocarbonaceous material as a crushed shale, it should be understood that other solid materials such as coal, tar-sands, lignite, and materials of a similar nature, may well be used in this operation. The material is crushed into relatively small particles of preferably less than 1 to 1½ inches, such that the material may be fed downwardly in a gravity flow without becoming blocked, however, in this operation, it is not necessary that the material be crushed to fines as with a fluidized process.

The chamber 4 is preferably a vertically elongated vessel having internal means to separate the upper pretreating zone 5 from the lower high temperature distillation zone 6, such that substantially separate descending beds of the shale may be maintained within each of the zones of the chamber. In the upper zone 5, the bed of material is countercurrently contacted with resulting hot gaseous distillation products and the gaseous heating medium, passing upwardly from the lower contacting zone 6. Thus, relatively cool shale entering the upper zone 5 becomes preheated by the hot gaseous stream and at the same time there is caused the cooling and condensation of a portion of the heavier distillation products. At the lower end of the upper preheating zone 5, means is provided to collect and withdraw the condensed liquid material from the chamber. A solid partitioning plate 7 and a vertical conduit or riser wall 8 together with a slopping screen, perforated plate, or grid 9, provide means for collecting a pool of the condensate substantially free of shale particles. In other words, the sloping grid or screen 9 permits the shale particles to descend continuously through the opening provided by the riser wall 8, while at the same time permitting the liquid condensate to filter into the well provided by plate 7 and the wall 8, so that the liquid may subsequently discharge from the chamber through a line 10. At the top of the chamber 4, a line 11 with control valve 12, provides means for discharging uncondensed distillation products and the cooled heating medium, the major portion of its heat having been utilized in effecting the distillation in the lower zone and preheating of the shale in the upper zone.

In the lower distillation zone 6, the crushed shale which has been preheated, as well as subjected to the solvent action of the condensate in the lower portion of the upper zone 5, passes downwardly in a relatively compact continuously moving descending bed countercurrently to a high temperature heating medium being introduced at the lower end of the chamber 4, through line 13 having control valve 14. The heating medium may be high temperature superheated steam, hot combustion gases, a heated hydrocarbon fraction obtained from the process, or other gaseous medium suitable for effecting the high temperature distillation of the solid material. Shale residue is continuously discharged from the lower end of the chamber by way of the conduit 15 and star feeder 16, or by other means suitable to continuously discharge the solid residue from the chamber for further treatment or disposal.

In carrying out the operation of the present invention, the heating medium introduced through line 13 to the lower end of the distillation zone 6 is supplied at a high temperature of from 900° F. to 1500° F. whereby substantially complete distillation and removal of the hydrocarbonaceous products may be effected. The distillation may be carried out at substantially atmospheric pressure, or at superatmospheric pressure where it is so desired, or where fractionation and recovery is to be effected at an elevated pressure.

The rate of flow of the heating medium being introduced at the lower end of the distillation zone is controlled and correlated with the size of opening in partitioning member 7 or pipe 8, so as to permit the downward flow of the crushed shale from the upper zone to the lower, while at the same time substantially preventing the downward flow of any of the pool of condensate maintained within the lower portion of the upper zone. Preferably, a substantially deep pool of liquid condensate is maintained within the lower portion of the pretreating zone 5, such that the liquid may have time to effect a solvent action on the bed of crushed shale as it passes therethrough to the lower zone. The hot condensate pool may be maintained at a high temperature approximating that maintained in the upper portion of the distillation zone such that a considerable degree of useful extraction may be obtained in combination with the distillation operation. In general, a solvent extraction operation alone does not remove all of the valuable hydrocarbonaceous products from the shale as efficiently as a high temperature distillation operation, however, as the temperature is increased, a larger amount of organic material may be extracted, and increased temperatures may in turn be effected by utilizing a superatmospheric pressure within the chamber 4.

In the apparatus embodiment shown, a liquid level controlling device 17, such as a float control, electrical indicators, or other level sensitive means, is attached to the chamber 4 in order that a substantially constant level and a relatively deep pool of condensate may be maintained within the lower portion of the pretreating zone 5. The level controlling device 17 connects through line 18 to a control valve 19 in line 10, such that a constant level is maintained in the chamber. Where the cooling action of the shale being introduced at the top of the chamber is insufficient to condense enough of the distillation product to maintain the desired depth of the pool in the lower portion of the pretreating zone 5, then a portion of the condensed products stream from line 10 may be passed through line 20 and valve 21, cooler 22, line 23, pump 24, and by way of line 25 to the upper end of the chamber wherein the partially cooled stream of condensate is introduced into the upper end of the pretreating zone to effect further condensation of distillation products. The operation, however, should not be limited to recycling a portion of the condensate stream as indicated, for obviously, other methods of supplying a reflux stream to the top of the bed in zone 5 may well be used, such as for example, the return of a distillate stream from a fractionator to which the gaseous fractions and condensation products are passed, for fractionation and separation into desired products.

Although not shown in the accompanying drawing, it is also within the scope of the present invention to utilize the hot shale residue, being discharged from the lower end of the chamber by way of line 15, to generate or at least aid in the generation of the high temperature medium being introduced through line 13 to the lower end of the distillation zone 6. For example, the hot shale residue may be introduced into a steam generating zone in which low temperature steam or water is converted to superheated steam which may be subsequently passed to line 13 as the medium for effecting high temperature distillation within zone 6. Alternately, residual carbonaceous matter on the spent shale may be burned by introducing an oxygen containing stream into a combustion chamber which connects with line 15, so that hot combustion gases or flue gases may be utilized to carry out the distillation operation in zone 6 by either passing the hot combustion gases directly to that zone or by utilizing the hot combustion gases to heat another gaseous medium which is to be introduced through line 13 to the distillation zone.

The apparatus indicated in the drawing for carrying out the improved operation, is, of course, not limited to that shown in the simplified diagrammatic drawing. For example, the chamber 4 may taper and increase slightly in diameter towards the lower end thereof, in order that the descending bed of shale will not stick or plug within the chamber as it descends therethrough. A single condensate collecting and withdrawal section is provided by the plate 7 and riser wall 8 in the present embodiment, however, where desirable multiple section withdrawal zone may be provided at the lower end of the pretreating zone to effect the collection and discharge of the liquid condensate substantially free of shale particles while maintaining a condensate pool. Also, where a float or other level sensitive device is used in connection with level controller 17, then a protecting screen 26 or the like may be provided around the instrument in order that it may not be injured by the descending bed of shale, while at the same time permitting the liquid condensate to enter screened portion at its normal level.

Provision in the apparatus and in the operation of the pretreating zone to maintain varying depths of the liquid condensate within the lower portion thereof, may be provided in a more elaborate embodiment of the apparatus. By permitting a varying depth of the liquid pool, a suitable depth may be attained to insure obtaining the advantage of the present improved process, whereby a hot condensate pool effects a solvent action on the slowly descending bed of shale prior to its being discharged into the high temperature distillation zone for contact with a high temperature gaseous medium. In other words, the contact time may necessarily be varied with different types of shale or other hydrocarbonaceous solids, to obtain an optimum degree of efficiency from the solvent extraction step in the pretreating zone.

I claim as my invention:

1. A method for extracting valuable products from a solid hydrocarbonaceous material which comprises, passing crushed solids downwardly through a combined preheating and products condensation zone countercurrently to an upwardly rising stream of distillation products and a gaseous heating medium being introduced at the lower end of said zone and obtained as hereinafter described, effecting the preheating of said crushed solids and the condensation of heavier distillation products on said solids within said zone, collecting and maintaining a pool of condensate within the lower end of said zone and passing the solids through said pool to effect a preheating and a solvent action on said solids descending through said zone, continuously withdrawing resulting condensation products from the lower end of said zone and discharging uncondensed light distillation products from the upper end thereof, passing the preheated solids from said pool of condensation products and from the lower end of said preheating and condensing zone downwardly through a restricted passageway in a regulated gravity flow to a high temperature distillation zone maintained below and in open communication with first said zone, passing a hot gaseous medium upwardly through said lower distillation zone at a rate regulated to provide an upward flow of hot distillation products and gaseous medium to the lower end of said upper zone precluding the downward flow of condensate from said pool, discharging residual spent solids from the lower end of said distillation zone and passing resulting distillation products and heating medium upwardly through said restricted passageway into said pool of condensate and through said upper preheating and condensation zone as hereinbefore described.

2. The method of claim 1 further characterized in that said hot gaseous heating medium is high temperature superheated steam.

3. The method of claim 1 further characterized in that said hot gaseous heating medium comprises combustion gases.

4. In the distillation and removal of valuable products from solid hydrocarbonaceous material wherein said material is passed in a crushed state downwardly through a distillation zone countercurrently to a high temperature gaseous heating medium to effect the removal of said valuable distillation products, the improved recovery method comprising, passing resulting distillation products and heating medium upwardly from the distillation zone to a super-imposed pretreating zone and countercurrently contacting a descending bed of crushed hydrocarbonaceous material being introduced thereto, effecting a preheating of said solid material and a partial condensation of distillation products in said pretreating zone, discharging uncondensed distillation products and substantially cooled heating medium from the upper end of said pretreating zone, collecting and discharging liquid condensate at the lower end thereof, restricting the cross-sectional area of said continuously descending bed of solid material at the lower end of said pretreating zone and regulating the upward flow of gaseous distillation products and heating medium to preclude the downward flow of liquid condensate with said solid material, regulating the withdrawal of condensate from said pretreating zone and maintaining a substantially constant depth liquid condensate body therein, passing the solid material through said liquid condensate body whereby to effect a controlled period of solvent action on said crushed solid material prior to its discharge to the lower high temperature distillation zone, and introducing a hydrocarbonaceous reflux stream to the upper end of said pretreating zone whereby to maintain the partial condensation of the heavier distillation products therein and an optimum depth of condensate in the lower portion of said pretreating zone.

5. The method of claim 4 further characterized in that said reflux being introduced at the upper end of said pretreating zone comprises a partially cooled portion of the liquid condensate being withdrawn from the lower end of said pretreating zone.

6. The method of claim 4 further characterized in that the solids residue from the lower end of said high temperature distillation zone is passed to an oxidation zone, a stream containing free oxygen is passed through said oxidation zone to oxidize and remove residual carbonaceous material from shale residue and to effect high temperature combustion gases, and said combustion gases are passed to the lower end of said distillation zone as said hot gaseous medium being introduced thereto.

7. The process of claim 4 still further characterized in that the solids residue from said distillation zone is passed to a combustion and burning zone, a free oxygen containing stream is introduced into said burning zone to effect the oxidation and combustion of residual carbonaceous matter in said distillation residue, resulting high temperature combustion gases and resulting high temperature ash are passed in heat exchange relationship with an aqueous stream to produce a high temperature superheated heated steam, and said superheated steam is introduced into the lower end of said high temperature distillation zone as said heating medium.

LOUIS S. KASSEL.

References Cited in the file of this patent

UNITED STATES PATENTS

| Number    | Name      | Date           |
|-----------|-----------|----------------|
| 1,143,319 | Rigby     | June 15, 1915  |
| 1,244,840 | Day       | Oct. 30, 1917  |
| 1,280,178 | Day       | Oct. 1, 1918   |
| 1,357,278 | Day       | Nov. 2, 1920   |
| 1,447,297 | Day       | Mar. 6, 1923   |
| 2,131,702 | Berry     | Sept. 27, 1938 |
| 2,194,574 | Snyder    | Mar. 26, 1940  |
| 2,396,036 | Blanding  | Mar. 5, 1946   |
| 2,445,328 | Keith     | July 20, 1948  |
| 2,471,119 | Peck et al. | May 24, 1949 |
| 2,501,153 | Berg      | Mar. 21, 1950  |

OTHER REFERENCES

Murphree: "The Fluid Solids Technique," Journal of Institute of Petroleums, vol. 33, Oct. 1947, pages 608 to 620.